(12) United States Patent
Timms et al.

(10) Patent No.: US 11,035,435 B2
(45) Date of Patent: Jun. 15, 2021

(54) ANTI-ROTATIONAL LOCKING DEVICE

(71) Applicant: Goodrich Actuation Systems Limited, West Midlands (GB)

(72) Inventors: Jack Timms, Wolverhampton (GB); Kevin Handley, Wolverhampton (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 629 days.

(21) Appl. No.: 15/835,596

(22) Filed: Dec. 8, 2017

(65) Prior Publication Data
US 2018/0163817 A1   Jun. 14, 2018

(30) Foreign Application Priority Data

Dec. 9, 2016   (EP) .................................... 16203289

(51) Int. Cl.
*F16C 1/26* (2006.01)
*F16G 11/02* (2006.01)
(Continued)

(52) U.S. Cl.
CPC .............. *F16G 11/02* (2013.01); *F16C 1/262* (2013.01); *F16C 11/10* (2013.01); *F16G 11/12* (2013.01); *F16M 2200/024* (2013.01)

(58) Field of Classification Search
CPC .. F16C 1/26; F16C 1/262; F16C 1/226; F16C 1/223; F16C 1/22; F16C 1/102; F16G 11/02; F16G 11/106; F16G 11/105
See application file for complete search history.

(56) References Cited

U.S. PATENT DOCUMENTS 2,551,577 A   5/1951   Baum
3,254,399 A   6/1966   Zahuranec
(Continued)

FOREIGN PATENT DOCUMENTS

EP   0485540 A1   5/1992
GB   2447735 A1   9/2008
WO   2011057627 A1   5/2011

OTHER PUBLICATIONS

"Polyether ether ketone," Wikipedia page url: <https://en.wikipedia.org/wiki/Polyether_ether_ketone>, obtained May 21, 2020.*
(Continued)

*Primary Examiner* — Richard W Ridley
*Assistant Examiner* — Brian J McGovern
(74) *Attorney, Agent, or Firm* — Cantor Colburn LLP

(57) ABSTRACT

An anti-rotational locking apparatus for locking an elongate rotatable element in a particular rotational position with respect to a housing include: a sleeve having an internal profile for slidably receiving therethrough a rotatable elongate element having a portion with an external profile configured to positively engage with the internal profile of the sleeve; a housing; and a locking pin. The sleeve has a flange with a first opening therein and the housing has a second opening therein, the locking pin being insertable in the openings. The flange is arranged for slidable alignment with the second opening in the housing such that when the openings are aligned, the locking pin may be inserted in the openings to lock the flange to the housing and thereby prevent rotation of the flange and of an elongate element extending therethrough and engaged therewith with respect to the housing.

19 Claims, 3 Drawing Sheets

(51) Int. Cl.
*F16G 11/12* (2006.01)
*F16C 11/10* (2006.01)

(56) References Cited

U.S. PATENT DOCUMENTS

| | | | | | |
|---|---|---|---|---|---|
| 5,261,292 | A | * | 11/1993 | Gabas | F16C 1/226 |
| | | | | | 74/500.5 |
| 9,174,695 | B1 | * | 11/2015 | Wang | F16C 19/163 |
| 2014/0223967 | A1 | * | 8/2014 | Prouvost | F16G 11/02 |
| | | | | | 66/170 |
| 2014/0352115 | A1 | * | 12/2014 | Devouge | H02G 3/32 |
| | | | | | 24/129 W |

OTHER PUBLICATIONS

Extended European Search Report for International Application No. 16203289.0 dated Jun. 21, 2017, 7 pages.

* cited by examiner

ANTI-ROTATIONAL LOCKING DEVICE

FOREIGN PRIORITY

This application claims priority to European Patent Application No. 16203289.0 filed Dec. 9, 2016, the entire contents of which is incorporated herein by reference.

TECHNICAL FIELD

The present disclosure relates to an anti-rotational locking device. In particular, the disclosure relates to a device for locking an elongate element, such as a cable, in a particular rotational position.

BACKGROUND OF THE INVENTION

In various areas of technology it may be desirable to lock an elongate element, such as a cable, in a particular rotational position, with it being possible to remove the locking when it is desired to allow the cable to once again rotate. One such technological area is that of rigging, such as rigging used in the maintenance of aircraft. The length of rigging cables may be adjustable by screwing an end of the cable into and out of a housing, i.e. by rotating the cable. Ideally, it should be possible to lock the cable at that particular length, e.g. by preventing further rotation of the cable. However, prior art methods of locking require specific tooling.

The present disclosure addresses this problem.

SUMMARY

From one aspect, the present disclosure provides an anti-rotational locking apparatus for locking an elongate rotatable element in a particular rotational position with respect to a housing, comprising: a sleeve having an internal profile for slidably receiving therethrough a rotatable elongate element having a portion with an external profile configured to positively engage with the internal profile of the sleeve; a housing; and a locking pin; wherein the sleeve has a flange with first opening therein and the housing has a second opening therein, the locking pin being insertable in the openings; wherein the first opening is arranged for slidable alignment with the second opening such that when the openings are aligned, the locking pin may be inserted in the openings to lock the flange to the housing and thereby prevent rotation of the flange and of an elongate element extending therethrough and engaged therewith with respect to the housing.

In embodiments, the internal profile of the sleeve is a spline profile. The length of the splines may extend in the longitudinal direction of the sleeve.

In embodiments, the housing has two second openings, one provided in each of two housing portions, the locking pin being insertable in both openings.

The flange may be arranged to slide between the housing portions for slidable alignment with both of the second openings in the housing. In embodiments, the housing portions are housing tabs.

In embodiments, the second opening (or each second opening) in the housing is provided with at least one groove holding an anti-vibrational seal.

In embodiments, the sleeve comprises polyetheretherketone (PEEK). In embodiments, the housing comprises steel.

In embodiments, the locking pin is a quick release pin.

In another aspect, the disclosure provides assembly comprising an anti-rotational locking apparatus according to any of the embodiments described above and a rotatable elongate element, wherein the rotatable elongate element has a portion with an external profile configured to positively engage with the internal profile of the sleeve; the assembly being arranged such that the sleeve is slidable over the rotatable element so that the internal profile of the sleeve engages with the external profile portion of the rotatable element and the first opening in the flange aligns with the second opening in the housing portion, whereby the locking pin may be inserted in the openings to lock the sleeve to the housing and thereby prevent rotation of the flange and of the elongate element extending therethrough with respect to the housing.

In embodiments, the assembly is arranged such that removal of the locking pin enables the sleeve to be slidably disengaged from the external profile portion of the rotatable element such that the rotatable element is free to rotate.

In embodiments, the internal profile of the sleeve is a spline profile and the external profile of the elongate element is a spline profile configured to positively engage with the internal profile of the sleeve.

In embodiments, the elongate element is a cable, preferably a rigging cable, preferably a rigging cable used in aircraft rigging.

In embodiments, the elongate element is received within a recess in the housing. The elongate element may have an external screw thread and the housing may have an internal screw thread to which the elongate element may be screwed by rotation.

The disclosure also extends to a method of locking a rotatable elongate element, such as a cable, in a particular rotational position utilising the anti-rotational locking apparatus according to the above described embodiments.

In another aspect, the disclosure provides a method of locking a rotatable elongate element in a particular rotational position with respect to a housing, comprising: sliding a sleeve over a portion of the elongate element having an external profile in order to positively engage an internal profile of the sleeve with the external profile of the elongate element and bring a first opening in a flange of the sleeve into alignment with a second opening in the housing; inserting a locking pin through the second opening in the housing and the first opening in the flange thereby locking the flange to the housing and preventing rotation of the flange and of the elongate element extending therethrough with respect to the housing.

In embodiments, the method further comprises removing the locking pin from the second opening in the housing and the first opening in the flange and slidably disengaging the sleeve from the portion of the elongate element having the external profile, such that the elongate element may be rotated.

In embodiments of the method, the internal profile of the sleeve is a spline profile and the external profile of the elongate element is a spline profile.

In embodiments of the method, the elongate element is a cable, such as a rigging cable used in aircraft rigging.

BRIEF DESCRIPTION OF THE DRAWINGS

Preferred embodiments of the present disclosure will now be described by way of example only and with reference to the accompanying drawings, in which.

DETAILED DESCRIPTION

Figure 1:
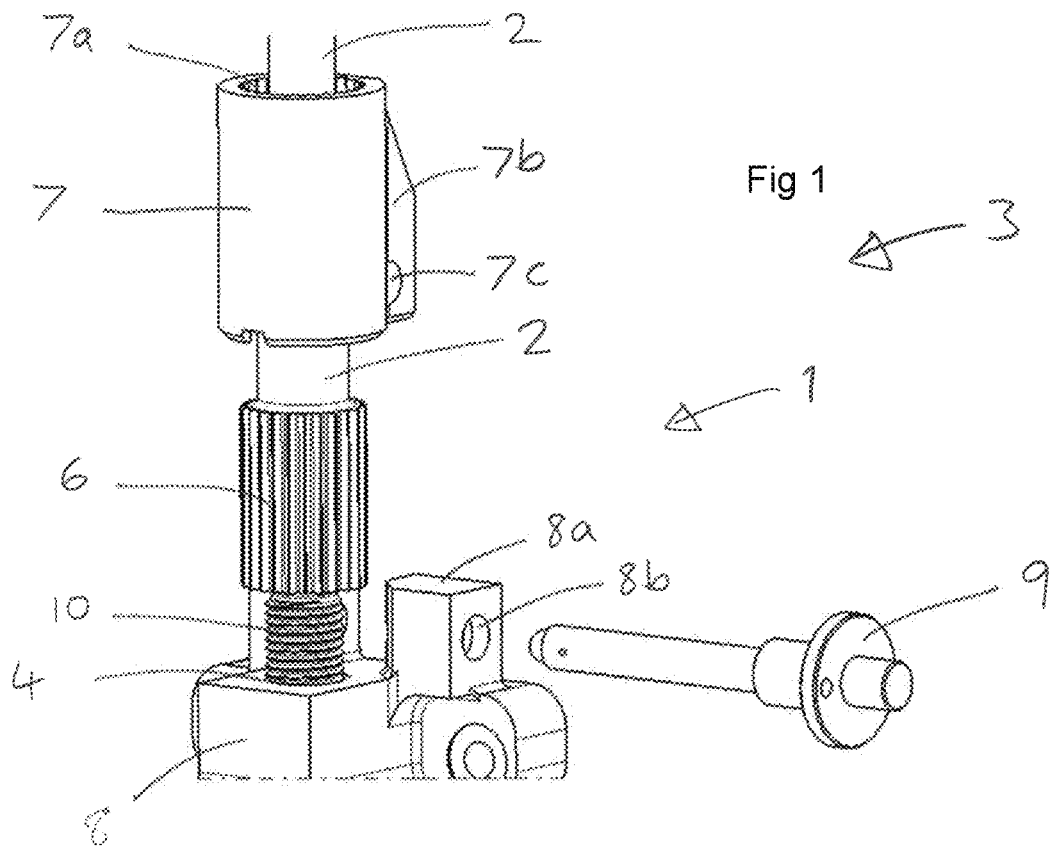
FIG. 1 is a perspective view of an anti-rotational locking apparatus 1 according to an embodiment of the disclosure, when locking is not effected.

An embodiment of an anti-rotational locking apparatus 1 for locking an elongate rotatable element 2 in a particular rotational (i.e. angular) position is illustrated in FIGS. 1 to 4. The combination of the anti-rotational locking apparatus 1 and elongate rotatable element 2 may be considered together as an assembly 3.

The apparatus 1 comprises a locking sleeve 7, a housing 8 having a housing portion 8a and a locking pin 9.

The sleeve 7 is a hollow cylindrical shaped element with a flange 7b extending from the outside of the sleeve 7, the flange 7b having an opening 7c (which may be termed a "first opening) therein for receiving the locking pin 9. In this embodiment, the opening extends through the flange 7b to form a hole, but in other embodiments it is envisaged that the opening may not extend entirely through the flange. The sleeve 7 has an internal profile, in this embodiment a spline profile 7a. The length of the splines extend in the longitudinal direction of the sleeve, e.g. in the drawings the vertical direction.

The housing portion 8a is part of a larger housing 8 which will be discussed further below. The housing portion 8a comprises an opening 8b (which may be termed a "second opening") for receiving the locking pin 9. In this embodiment, the opening 8b extends through the housing portion 8a to form a hole, but in other embodiments it is envisaged that the opening may not extend entirely through the housing portion. However, since it must be possible to insert the locking pin within both the opening 7c of the flange 7b and the opening 8b of the housing portion 8a, at least one of the openings must extend through the relevant part to form a hole. The housing 8 also has a mounting lug 8d for mounting the housing 8 to a desired device, e.g. an aircraft structure.

Figure 4:
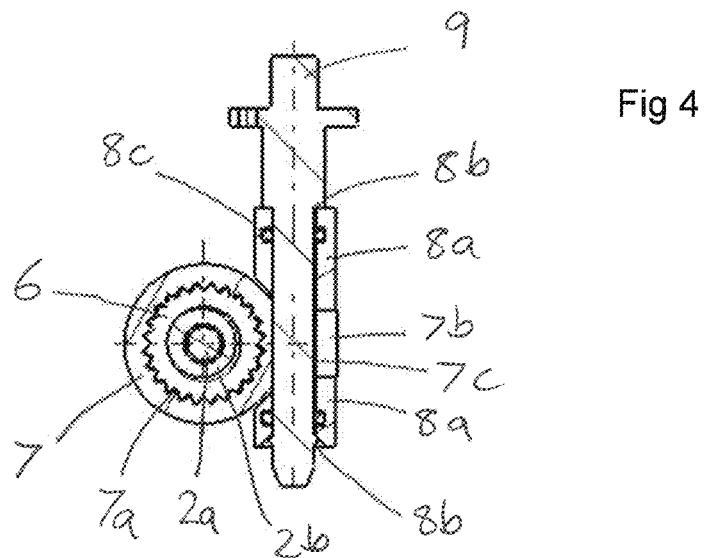
FIG. 4 is a sectional view taken along the line A-A in FIG. 3.
Figure 5:
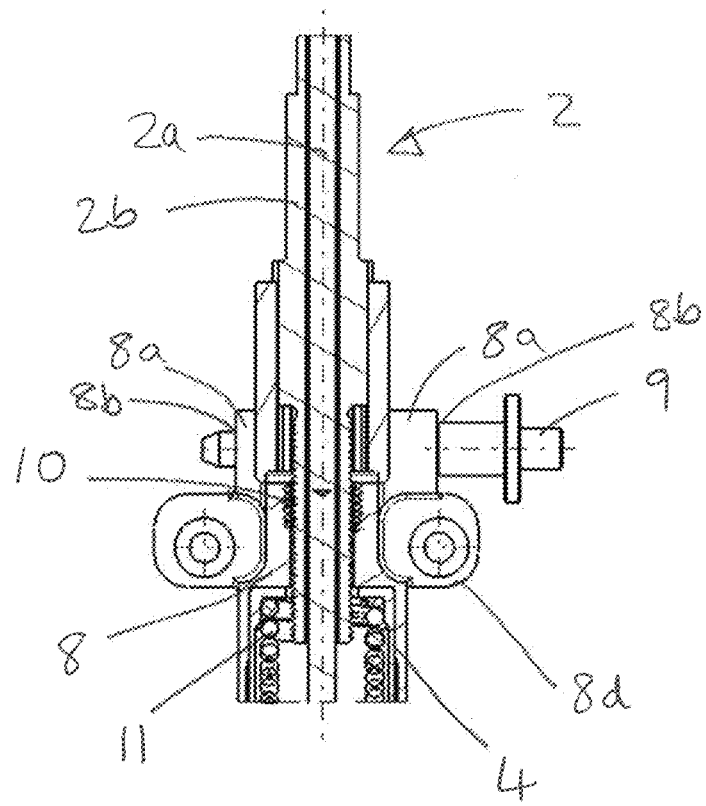
FIG. 5 is a sectional view taken along the ling B-B in FIG. 3.

In this embodiment, two housing portions 8a having openings 8b are provided with a gap therebetween, as can be seen in FIGS. 4 and 5. However, in other embodiments, only one housing portion 8a having an opening 8b is provided.

The locking pin 9 comprises a shaft for insertion through the opening 8b of the housing portion 8a and the opening 7c of the flange 7b. In this embodiment, the locking pin 9 is a quick release pin; quick release pins are well known in the art and will not be described further here. A person skilled in the art would recognise that other known types of locking pins could be used.

The openings 8b in the housing portions 8a each have internal grooves fitted with anti-vibrational seals 8c. The skilled man would appreciate that any suitable anti-vibrational seal 8c may be used, such as rubber seals. Such seals can be useful in a high vibration environment (e.g. in aircraft rigging as will be discussed further below) to minimise the vibration transferred to the locking pin 9 and thereby minimise any vibration-related damage to the locking pin 9.

In the illustrated embodiment, the anti-rotational locking apparatus 1 is configured for locking a rotatable cable 2 in a particular rotational position. The length of the rotatable cable can be adjusted by rotating it, and consequently, in order to enable it to be locked at a particular length, it is necessary to lock it in the corresponding rotational position.

To enable the length to be adjusted, the rotatable cable comprises a portion with an external screw thread 10 which may be screwed into a recess 4 in housing 8 (preferably a free running insert). In one embodiment, the end fitting of the cable 2 installs into the free running thread insert 10. In the illustrated embodiment, the cable 2 comprises a cable inner member 2a and a cable outer member 2b that are axially and radially independent. When the cable 2 is rotated so as to screw it into and out of the housing 8, it is specifically the length of the cable outer member 2b that is adjusted. However, this change in length adjusts the routing for the cable inner member 2a and therefore creates a corresponding effective length adjustment for the cable inner member 2a. As the cable 2 is rotated so as to screw it into the housing 8, the length of the cable outer member 2b decreases relative to the cable inner member 2a, effectively decreasing the tension in the cable assembly. This is because the inner cable remains the same length throughout, thus when the outer cable 2b is shortened this reduces the length the inner cable 2a has to run and therefore slackens, i.e. decreases the tension in, the inner cable 2a. As the cable 2 is rotated so as to unscrew it from the housing 8, the cable outer member 2b length increases relative to the cable inner member 2a, effectively increasing the tension in the cable.

In the recess 4 in housing 8 is disposed a spring 11. The spring is attached to the cable inner member 2a and applies tension to the cable inner member 2a.

The cable outer member 2b has a profiled portion 6 of cylindrical shape extending therearound, having an external profile. The profiled portion may be integrally formed with the cable 2 or may be a portion attached to the cable. In the illustrated embodiment the profile is a spline profile, wherein the length of the splines extends in the longitudinal direction of the profiled portion/cable. The profiled portion 6 may typically be used to control the exact amount of increment in rotation applied to the cable 2 e.g. rotating by a certain number of spline teeth may provide a certain change in length, thus enabling accurate adjustment. It may also be used to grip the cable and rotate it.

The internal spline profile 7a of the sleeve 7 is shaped so as to be engageable (provide positive engagement) with the external spline profile of the profiled portion 6 of the cable 2. In other words, the spline teeth of the spline profile 7a can interlock with those of the profiled portion 6, with one spline tooth of one component fitting between two spline teeth of the other component. The profiles of the sleeve and profiled portion 6 may thus be considered "complimentary". When the sleeve 7 and profiled portion 6 are positively engaged in this way, relative rotation between the two components is prevented.

Whilst the illustrated embodiment utilises a spline profile to provide engagement between the sleeve 7 and the profiled portion 6 of the cable outer member 2b, it will be appreciated that any suitable profile shape of the sleeve 7 and profiled portion 6 could be used which is capable of (i.e. configured to) provide positive engagement between the sleeve 7 and the profiled portion 6, and capable of (i.e. configured to) react the torque applied to the sleeve 7.

The cable 2 is advantageously rotatable by hand, in fact one-handed operation of the apparatus is possible since the sleeve 7 can be slid up and down with the same hand that has rotated the cable (as is discussed later). However, optionally, a hexagonal shaped portion 12 may be provided around the outside of the cable 2 (or the outside of the cable may be hexagonal shaped) which can be used to apply additional leverage to the cable outer member to help turn it, if required.

When the rotatable cable 2 has been rotated to the correct rotational (i.e. angular) position so as to be at the correct length, it is desirable to lock it in place and prevent further rotation thereof. This is achieved by the locking apparatus 1 of the present disclosure. During rotation of the cable 2, or when it is simply desired that the rotational position of the cable 2 is not locked, the sleeve 7 of the locking apparatus 1 is not engaged with the profiled portion 6 of the cable. Rather, as is shown in FIG. 1, it is slid along the cable 2 away from the profiled portion 6. The cable 2 can therefore be rotated freely.

Figure 2:
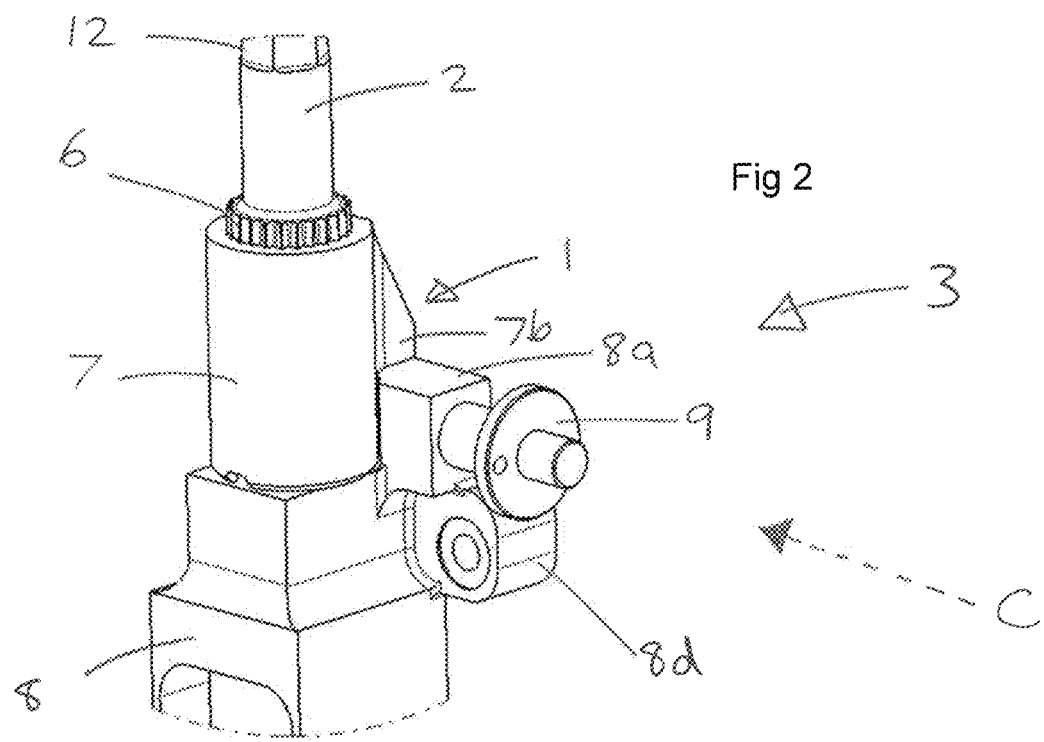
FIG. 2 is a perspective view of the embodiment of FIG. 1 when locking has been effected.
Figure 3:
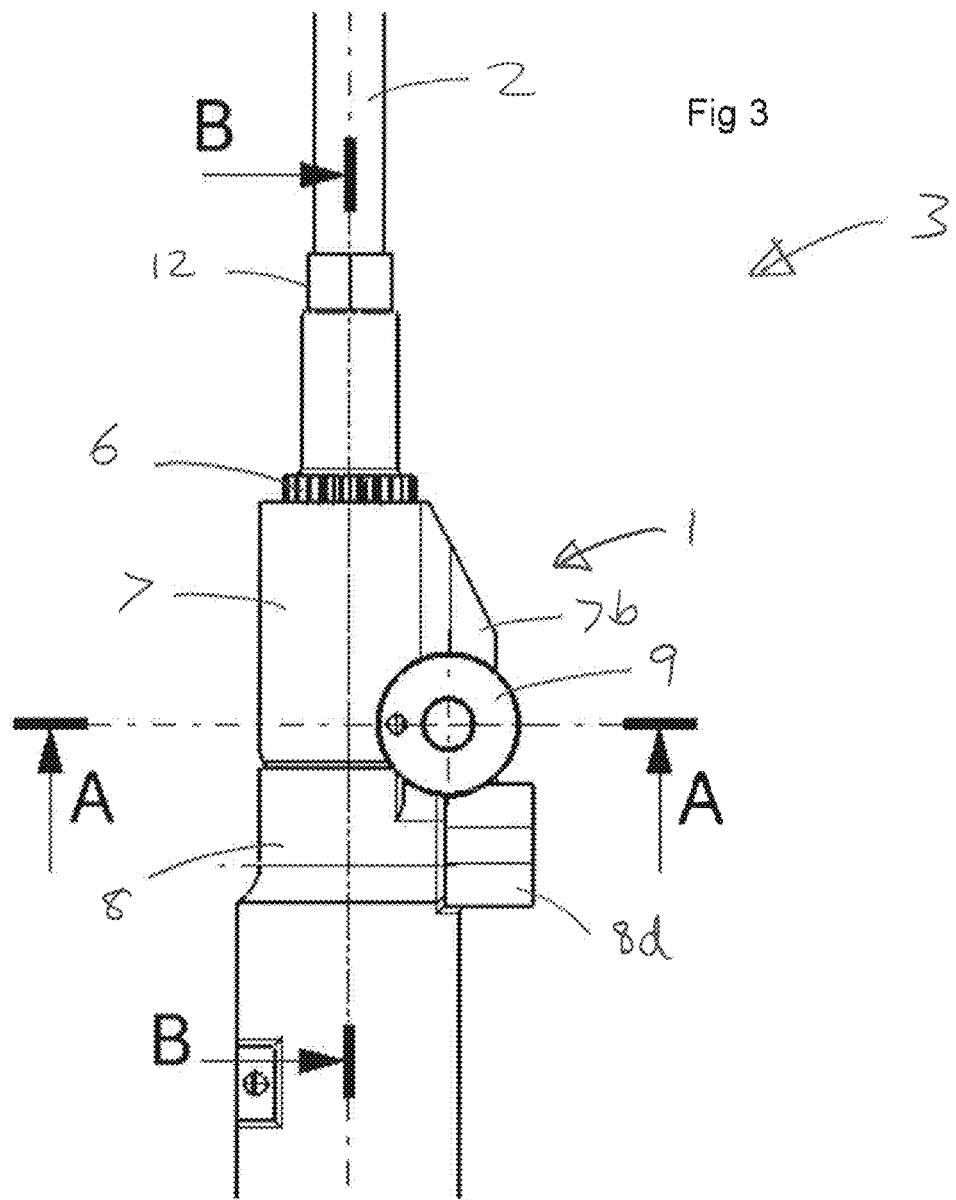
FIG. 3 is a front view of the configuration of FIG. 2, when viewed in the direction of arrow C in FIG. 2.

When it is desired to lock the rotational position of the cable 2, the sleeve 7 is slid down over the profiled portion 6 of the cable, as is shown in FIG. 2. The internal spline profile 7a of the sleeve 7 positively engages with the complimentary (mating) external spline profile of the profiled portion 6. The sleeve 7 is then engaged with the profiled portion 6 of the cable 2. In this position, the flange 7b slides between the housing portions 8a and the opening 7c aligns with the openings 8b. The locking pin 9 is then inserted through the openings 7b, 8b and locks in place as shown in FIG. 2. This locks the sleeve 7 to the housing portions 8a (thus the housing 8) and prevents rotation thereof. Since the profile 7a of the sleeve 7 and profiled portion 6 of the cable are engaged and therefore cannot rotate relative to each other, the locking of the sleeve 7 to the housing 8 thereby locks the cable 2 to the housing 8. Consequently, the cable 2 is rotationally locked, it's angular position is locked, (i.e. it is unable to rotate) with respect to the housing 8.

Thus, in this way, the cable 2 can be rotationally locked in place quickly and easily by hand. The user needs no special tooling, rather, the apparatus is operated simply by sliding the sleeve 7 by hand and inserting or removing the locking pin 9. In fact, one-handed adjustment is possible. Thus, the disclosure provides a means of manual tool-less rotational adjustment and locking. Not only is this simple and effective, but inexpensive particularly given that no special tooling is required.

One particular application of the anti-rotational locking apparatus of the present disclosure, in particular the above described embodiment, is for locking the rotational position of rigging cables during aircraft maintenance. For example, in some aircraft, the hydraulic control unit sits in the pylon of the engine over 1.5 m away from the access panel (on the side of the nacelle) used by ground personnel in maintenance work. So as to inhibit the system so that it is safe for maintenance work to be carried out, a valve on the hydraulic control unit must be operated from the access panel.

A cable may therefore be used to operate the valve remotely. In normal operation, a user can pull the cable which in turn pulls a self-resetting valve within the hydraulic control unit to a stop, and by releasing the tension in this cable the unit becomes inhibited. However, to account for build tolerances across the gap that it bridges, it may be necessary to adjust the cable length. This can be done using the assembly 3 of the present disclosure, which may in this situation be called a "rigging device".

The length of the cable 2 can be adjusted as described above by screwing the cable 2 into and out of the housing 8. This changes the length of the cable outer member 2a and therefore changes the routing of the cable inner member 2b. The routing change creates an effective change in length for the inner member 2b. The rotational position (and thus the length) of the cable 2 is locked using anti-rotational locking apparatus 1 as described above, i.e. by sliding sleeve 7 over the profiled portion 6 of the cable 2 and locking it in place with the locking pin 9. One handed adjustment to the cable length is possible leaving the other hand free to test that rigging is complete. The resolution of the rigging position can be accurately specified by the number of splines and the free running insert pitch.

In this example, a steel cable may be used having a cable outer member with a diameter of 13 mm and a cable inner member with a diameter of 5 mm. The assembly may enable a change in cable length of up to 12 mm. However, the skilled person will appreciate that the cable diameter can be selected according to the particular application, as can the change in cable length provided for, which can be adjusted by adjusting the length of the splines and the threaded portion. The type of locking pin, e.g. the type of quick release pin, may also be chosen based on application.

The aircraft maintenance environment can be a high vibration environment, but the locking apparatus 1 of the present disclosure is strong enough to withstand such vibration and provides effective locking even in such an environment.

The housing 8 (including housing portions 8a) is in one embodiment, made from steel. The sleeve 7 is, in one embodiment made from Polyetheretherketone (PEEK). PEEK is particularly preferred because the cable will not react or corrode when placed next to it, thus the cable can be made of any material. In one embodiment, the cable is a steel cable. PEEK is also advantageously lightweight, is of high enough strength to withstand the forces applied to it e.g. in the above described rigging scenario, and can withstand high temperatures which is useful e.g. in the above described rigging scenario.

Whilst the illustrated locking device 1 is arranged for locking a rotatable cable 2 having an inner cable 2a and an outer cable 2b, it can equally be used to lock any rotatable cable, indeed any rotatable elongate element, in a selected rotational (angular) position.

While the apparatus and methods of the subject disclosure have been shown and described with reference to embodiments, those skilled in the art will readily appreciate that changes and/or modifications may be made thereto without departing from the scope of the subject disclosure.

The invention claimed is:

1. A locking apparatus for a Bowden cable, comprising:
the Bowden cable includes an inner cable member and an outer cable member, the outer cable member includes a plurality of longitudinally extending external splines and a threaded portion, the threaded portion is disposed on a distal end of the outer cable member and the plurality of longitudinally extending external splines is disposed at an intermediate portion of the outer cable member;
a sleeve provided externally to a housing, the sleeve including a flange and a plurality of longitudinally extending internal splines, the flange includes a first opening, the plurality of longitudinally extending internal splines is configured to engage the plurality of longitudinally extending external splines in order to lock the outer cable member in position;
the housing including a recess and at least one second opening, the threaded portion of the outer cable member is configured to engage the recess of the housing in order to adjust the position of the outer cable member relative to the housing;

a locking pin configured to be inserted into the first opening and the at least one second opening.

2. The locking apparatus according to claim 1, wherein the sleeve is configured to be axially movable between a first position and a second position.

3. The locking apparatus according to claim 2, when the sleeve is in the first position, the plurality of longitudinally extending external splines is disengaged from the plurality of longitudinally extending internal splines which allows for relative rotation between the outer cable member and the housing, relative rotation between the outer cable member and the housing adjusting the position of the outer cable member relative to the housing.

4. The locking apparatus according to claim 3, when the sleeve is in the second position, the plurality of longitudinally extending external splines are engaged with the plurality of longitudinally extending internal splines which prevents relative rotation between the outer cable member and the housing.

5. The locking apparatus according to claim 2, wherein when the sleeve is in the first position, the locking pin is removed from the first opening and the at least one second opening.

6. The locking apparatus according to claim 5, wherein when the sleeve is in the second position, the first opening is aligned with the at least one second opening and the locking pin is inserted through the first opening and the at least one second opening.

7. The locking apparatus according to claim 2, wherein the at least one second opening includes two second openings, each of the two second openings being formed into a respective tab formed on the housing.

8. The locking apparatus according to claim 7, wherein when the sleeve is in the second position, the flange of the sleeve is disposed between the respective tabs of the housing such that the first opening and the two second openings are aligned such that the locking pin is inserted through the first opening and the two second openings.

9. The locking apparatus according to claim 1, wherein the at least one second opening is provided with at least one groove holding an anti-vibrational seal.

10. The locking apparatus according to claim 1, wherein the sleeve comprises polyetheretherketone (PEEK) and/or the housing comprises steel.

11. The locking apparatus according to claim 1, where the locking pin is a quick release pin.

12. The locking apparatus according to claim 1, wherein the housing further includes a mounting lug configured to mount the housing to an aircraft structure, and the Bowden cable is a rigging cable used in aircraft rigging.

13. The locking apparatus according to claim 1, wherein the housing contains a spring disposed therein.

14. A method of locking, unlocking, and adjusting a Bowden cable, comprising:
providing the Bowden cable with an inner cable member and an outer cable member, the outer cable member includes a plurality of longitudinally extending external splines and a threaded portion, the threaded portion is disposed on a distal end of the outer cable member and the plurality of longitudinally extending external splines is disposed at an intermediate portion of the outer cable member;
providing a sleeve externally to a housing, the sleeve including a flange and a plurality of longitudinally extending internal splines, the flange includes a first opening, the plurality of longitudinally extending internal splines is configured to engage the plurality of longitudinally extending external splines in order to lock the outer cable member in position;
providing the housing with a recess and at least one second opening, the threaded portion of the outer cable member is configured to engage the recess of the housing in order to adjust the position of the outer cable member relative to the housing;
providing a locking pin configured to be inserted into the first opening and the at least one second opening.

15. The method of locking according claim 14, further comprising: moving the sleeve axially between a first position and a second position.

16. The method of locking according to claim 15, wherein:
when the sleeve is in the first position, the plurality of longitudinally extending external splines is disengaged from the plurality of longitudinally extending internal splines;
when the sleeve is in the second position, the plurality of longitudinally extending external splines are engaged with the plurality of longitudinally extending internal splines.

17. The method of locking according to claim 16, further comprising: moving the sleeve from the first position to the second position and subsequently inserting the locking pin through the first opening and the at least one second opening.

18. The method of locking according to claim 17, further comprising: removing the locking pin from the first opening and the at least one second opening and moving the sleeve from the second position to the first position.

19. The method of locking according to claim 18, further comprising: subsequent to the sleeve moving from the second position to the first position, rotating the outer cable member relative to the housing thus adjusting the position of the outer cable member relative to the housing.

* * * * *